US012512909B2

United States Patent
Satou

(10) Patent No.: US 12,512,909 B2
(45) Date of Patent: Dec. 30, 2025

(54) OPTICAL COMMUNICATION DEVICE AND OPTICAL COMMUNICATION SYSTEM

(71) Applicant: FANUC CORPORATION, Yamanashi (JP)

(72) Inventor: Yoshiki Satou, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 233 days.

(21) Appl. No.: 18/276,584

(22) PCT Filed: Feb. 4, 2022

(86) PCT No.: PCT/JP2022/004349
§ 371 (c)(1),
(2) Date: Aug. 9, 2023

(87) PCT Pub. No.: WO2022/176638
PCT Pub. Date: Aug. 25, 2022

(65) Prior Publication Data
US 2024/0113775 A1    Apr. 4, 2024

(30) Foreign Application Priority Data
Feb. 17, 2021    (JP) .................. 2021-023203

(51) Int. Cl.
*H04B 10/07* (2013.01)
*H04B 10/075* (2013.01)
(Continued)

(52) U.S. Cl.
CPC ........... *H04B 10/075* (2013.01); *H04B 10/03* (2013.01); *H04B 10/035* (2013.01); *H04B 10/07* (2013.01);
(Continued)

(58) Field of Classification Search
CPC .. H04B 10/075; H04B 10/071; H04B 10/077; H04B 10/03; H04B 10/035; H04B 10/07; H04B 10/27; H04B 10/40
(Continued)

(56) References Cited

U.S. PATENT DOCUMENTS 5,491,548 A * 2/1996 Bell .................... G01M 11/3145
356/73.1
6,834,139 B1 * 12/2004 Prairie ................ H04L 43/0811
398/4
(Continued)

FOREIGN PATENT DOCUMENTS

JP    64-046915 U    3/1989
JP    4-242136 A    8/1992
(Continued)

OTHER PUBLICATIONS

International Search Report for PCT/JP2022/004349 dated, May 10, 2022 (PCT/ISA/210).

*Primary Examiner* — Dibson J Sanchez
(74) *Attorney, Agent, or Firm* — Sughrue Mion, PLLC

(57) ABSTRACT

An optical communication device according to an embodiment is provided with: a communication circuit for transmitting and receiving a signal using a first communication optical fiber connected to a first port; a tester circuit for transmitting and receiving a test signal using a loop-back optical fiber connected to a second port; a determining unit which, when the amount of optical reception of the test signal is lower than a threshold value, determines that the
(Continued)

loop-back optical fiber is degraded; and a notifying unit for notifying a determination result from the determining unit.

4 Claims, 4 Drawing Sheets

(51) Int. Cl.
    *H04B 10/03*           (2013.01)
    *H04B 10/035*        (2013.01)
    *H04B 10/077*        (2013.01)
    *H04B 10/27*          (2013.01)
    *H04B 10/40*          (2013.01)

(52) U.S. Cl.
    CPC ............ *H04B 10/077* (2013.01); *H04B 10/27* (2013.01); *H04B 10/40* (2013.01)

(58) Field of Classification Search
    USPC ............... 398/1–8, 9–38, 135–139, 140–172
    See application file for complete search history.

(56) References Cited

U.S. PATENT DOCUMENTS

| | | | |
|---|---|---|---|
| 7,471,897 B1* | 12/2008 | Theodoras, II | H04B 10/035 398/22 |
| 9,307,506 B1 | 4/2016 | Kelly et al. | |
| 2003/0223380 A1* | 12/2003 | Asakawa | H04J 3/14 370/258 |
| 2007/0115456 A1* | 5/2007 | Wisseman | H04B 10/00 356/73.1 |
| 2009/0185498 A1* | 7/2009 | Astigarraga | H04B 10/035 370/249 |
| 2011/0069950 A1* | 3/2011 | Ito | H04B 10/073 398/9 |
| 2013/0017732 A1* | 1/2013 | Parke | H01R 13/641 439/660 |
| 2014/0016479 A1* | 1/2014 | Coomber | H04L 43/50 370/252 |
| 2015/0358087 A1* | 12/2015 | Pavlas | H04B 10/564 398/182 |
| 2016/0334503 A1* | 11/2016 | Ginsburg | G01S 7/4056 |
| 2016/0337732 A1* | 11/2016 | Al-Walaie | H04L 41/0661 |
| 2017/0142503 A1* | 5/2017 | Takei | H04Q 11/0005 |
| 2020/0099445 A1* | 3/2020 | Storey | H04B 10/0775 |
| 2021/0247583 A1* | 8/2021 | Elkins, II | G02B 6/4471 |

FOREIGN PATENT DOCUMENTS

| | | |
|---|---|---|
| JP | H07-202954 A | 8/1995 |
| JP | 2015-008437 A | 1/2015 |
| JP | 2015-056877 A | 3/2015 |
| JP | 2015-115785 A | 6/2015 |

* cited by examiner

OPTICAL COMMUNICATION DEVICE AND OPTICAL COMMUNICATION SYSTEM

CROSS REFERENCE TO RELATED APPLICATIONS

This application is a National Stage of International Application No. PCT/JP2022/004349 filed Feb. 4, 2022, claiming priority based on Japanese Patent Application No. 2021-023203 filed Feb. 17, 2021, the disclosures of which are incorporated by reference.

TECHNICAL FIELD

The present invention relates to an optical communication device and an optical communication system for communicating via a communication optical fiber.

BACKGROUND ART

JP S64-046915 U discloses an optical fiber composite overhead cable. The optical fiber composite overhead cable incorporates a communication optical fiber for signal transmission and a monitoring optical fiber for life estimation. Each of optical fibers has a service life to withstand a required life time. According to JP S64-046915 U, the life time of an optical fiber cable is estimated by using a monitoring optical fiber having a service life that is shorter than that of a communication optical fiber.

SUMMARY OF THE INVENTION

However, since the optical fiber composite overhead cable disclosed in JP S64-046915 U incorporates a communication optical fiber and a monitoring optical fiber, the diameter of the optical fiber composite overhead cable tends to become larger. Further, it is difficult to incorporate a monitoring optical fiber into an existing communication optical fiber.

Accordingly, it is an object of the present invention to provide an optical communication device and an optical communication system which can detect an abnormality of an existing communication optical fiber in an early stage even when the existing communication optical fiber is used as it is.

According to a first aspect of the present invention, there is provided an optical communication device including a first port including a first light emitting element and a first light receiving element, and to which a first communication optical fiber is configured to be connected, a loopback optical fiber configured to have an optical attenuation amount per unit distance larger than an optical attenuation amount per unit distance of the first communication optical fiber, a second port including a second light emitting element and a second light receiving element, and to which the loopback optical fiber is configured to be connected, a communication circuit configured to transmit a transmission signal to the first communication optical fiber using the first light emitting element and receive a reception signal from the first communication optical fiber using the first light receiving element, a tester circuit configured to transmit a test signal to the loopback optical fiber using the second light emitting element and receive the test signal from the loopback optical fiber using the second light receiving element, a determination unit configured to determine that the loopback optical fiber is deteriorated in a case that an amount of light received by the second light receiving element is less than a threshold, and a notification unit configured to issue a notification concerning a determination result of the determination unit.

According to a second aspect of the present invention, there is provided an optical communication system including a plurality of optical communication units which are connected in a daisy chain via a communication optical fiber and are configured to transmit and receive signals to and from each other, wherein at least one of the plurality of optical communication units is provided with the above-mentioned optical communication device.

According to the aspects of the present invention, Thus, when it is determined that the loopback optical fiber is deteriorated, it is possible to issue a warning to the operator that there is a possibility of deterioration of the communication optical fiber, and to give the operator an opportunity for inspection or the like. As a result, it is possible to detect an abnormality of the communication optical fiber at an early stage even if the existing communication optical fiber is used as it is.

DETAILED DESCRIPTION OF THE INVENTION

Embodiment

Figure 1:
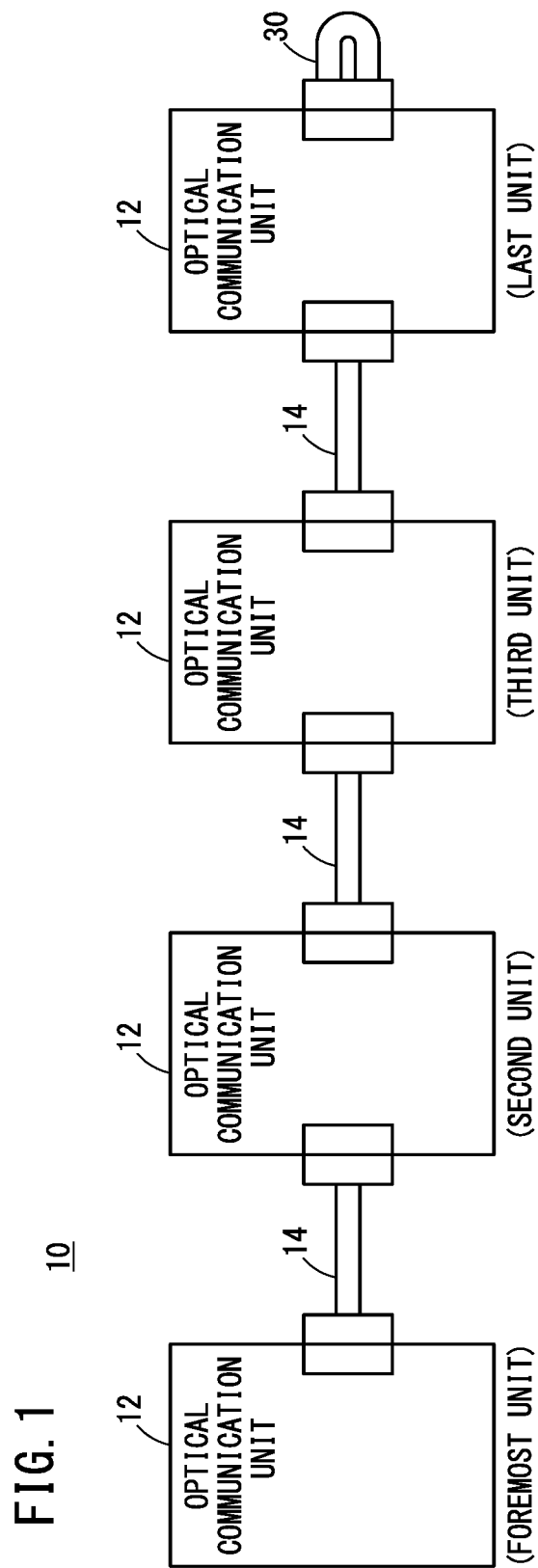
FIG. 1 is a block diagram of an optical communication system according to an embodiment.

FIG. 1 is a block diagram of an optical communication system 10 according to an embodiment. An optical communication system 10 includes a plurality of optical communication units 12. The plurality of optical communication units 12 are connected in a daisy chain via communication optical fibers 14. In other words, the plurality of optical communication units 12 are connected in sequence or in series via the communication optical fibers 14. Each of the communication optical fibers 14 may be constituted by one optical fiber for transmission and reception, or by two optical fibers including an optical fiber for transmission and an optical fiber for reception.

The plurality of optical communication units 12 can transmit and receive signals to and from each other. For example, the foremost (first) optical communication unit 12 among the plurality of optical communication units 12 connected in a daisy chain can transmit and receive signals to and from the second optical communication unit 12. Among the plurality of optical communication units 12 connected in a daisy chain, the last optical communication unit 12 can transmit and receive signals to and from the penultimate optical communication unit 12 that is located one before the last optical communication unit 12. Further, among the plurality of optical communication units 12 connected in a daisy chain, each of the optical communication units 12 other than the foremost optical communication unit 12 and the last optical communication unit 12 can transmit and receive signals to and from both the immediately preceding optical communication unit 12 and the immediately following optical communication unit 12.

In this embodiment, the number of the optical communication units 12 is four. Further, in this embodiment, the foremost optical communication unit 12 is a master unit, and each of the second to fourth optical communication units 12 is a slave unit. The master unit controls communications of each of the plurality of optical communication units 12. The slave units operate under the control of the master unit.

For example, when the foremost optical communication unit 12 communicates with the fourth optical communication unit 12, the foremost optical communication unit 12 controls the second optical communication unit 12 and the third optical communication unit 12. In this case, the foremost optical communication unit 12 causes the second optical communication unit 12 and the third optical communication unit 12 to relay information for transmission/reception with the fourth optical communication unit 12. Further, for example, when the foremost optical communication unit 12 communicates with the second optical communication unit 12, the foremost optical communication unit 12 does not control the third optical communication unit 12 or the fourth optical communication unit 12. In this case, the third optical communication unit 12 and the fourth optical communication unit 12 do not operate. The foremost optical communication unit 12 transmits and receives information to and from the second optical communication unit 12.

Figure 2:
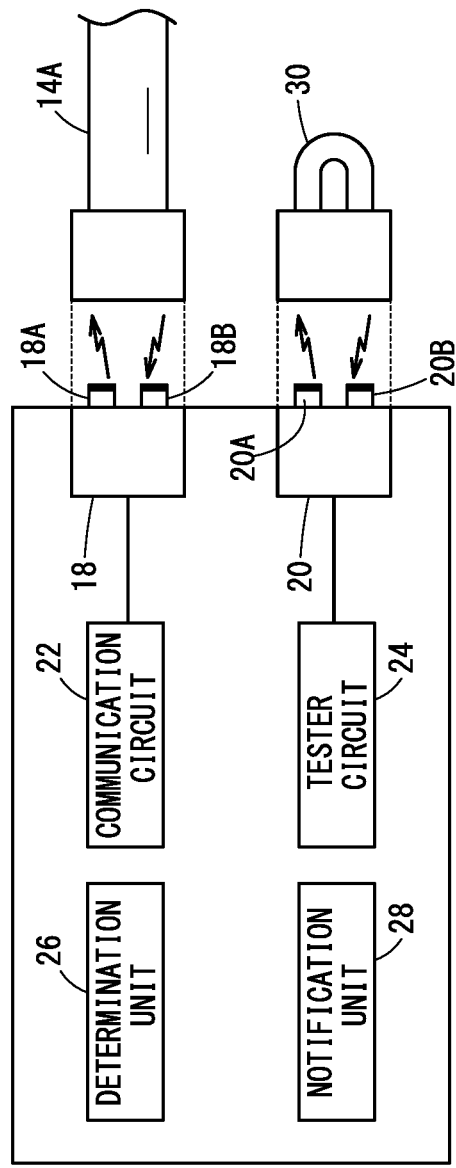
FIG. 2 is a block diagram illustrating an optical communication device.

FIG. 2 is a block diagram illustrating an optical communication device 16. In this embodiment, the optical communication device 16 is provided in the last optical communication unit 12 (fourth optical communication unit 12) (see FIG. 1).

The optical communication device 16 includes a first port 18, a second port 20, a communication circuit 22, a tester circuit 24, a determination unit 26, and a notification unit 28.

The first port 18 is a port to which a first communication optical fiber 14A for communicating with the optical communication unit 12 can be connected. The first port 18 has a first light emitting element 18A and a first light receiving element 18B. In the present embodiment, the optical communication device 16 can communicate with the third optical communication unit 12 (see FIG. 1) via the first communication optical fiber 14A connected to the first port 18.

The second port 20 is a port to which a loopback optical fiber 30 having a larger optical attenuation amount per unit distance than that of the first communication optical fiber 14A can be connected. The second port 20 has a second light emitting element 20A and a second light receiving element 20B. In this embodiment, since the optical communication device 16 is provided in the last optical communication unit 12, the second port 20 is a free port to which the communication optical fiber 14 is not connected. The loopback optical fiber 30 is connected to the free port.

As a method for causing the optical attenuation amount per unit distance of the loopback optical fiber 30 to be larger than the optical attenuation amount per unit distance of the first communication optical fiber 14A, any one of the plural following methods can be employed. Further, a combination of the two or more methods may be employed. In a first method, a bend radius of the loopback optical fiber 30 is made smaller than that of the first communication optical fiber 14A. In a second method, a fiber diameter of the loopback optical fiber 30 is reduced. In a third method, a material having a larger attenuation amount than the material used for the first communication optical fiber 14A is used for the loopback optical fiber 30. In a fourth method, a space transmission length from a fiber end of the loopback optical fiber 30 to at least one of the second light emitting element 20A or the second light receiving element 20B, is increased. In a fifth method, the fiber end of the loopback optical fiber 30 is cut obliquely. As a sixth method, the fiber end of the loopback optical fiber 30 is subjected to scratch processing such as frosting.

The communication circuit 22 is a circuit for transmitting a transmission signal to the first communication optical fiber 14A using the first light emitting element 18A and for receiving a reception signal from the first communication optical fiber 14A using the first light receiving element 18B. The communication circuit 22 controls the first light emitting element 18A based on the transmission signal, thereby outputting an optical signal corresponding to the transmission signal to the first communication optical fiber 14A. The communication circuit 22 acquires a reception signal corresponding to a transmission signal based on an optical signal output from the first communication optical fiber 14A and received by the first light receiving element 18B.

The tester circuit 24 is a circuit for transmitting a test signal to the loopback optical fiber 30 using the second light emitting element 20A and for receiving a test signal from the loopback optical fiber 30 using the second light receiving element 20B. The tester circuit 24 controls the second light emitting element 20A based on the test signal, thereby outputting an optical signal corresponding to the test signal to the loopback optical fiber 30. The tester circuit 24 acquires a test signal based on an optical signal output from the loopback optical fiber 30 and received by the second light receiving element 20B.

The timing at which the tester circuit 24 transmits the test signal may be when an transmission instruction, output from the operation unit in response to an operator's operation, of the test signal is received, or may be when a predetermined period has elapsed.

The determination unit 26 determines that the loopback optical fiber 30 is deteriorated when the amount of light received by the second light receiving element 20B is less than a threshold. Some light receiving elements perform photoelectric conversion and output a signal when the intensity is equal to or greater than a predetermined intensity, and do not output a signal when the intensity is less than the predetermined intensity because photoelectric conversion cannot be performed. When such a light receiving element is employed as the second light receiving element 20B, the case where the amount of light received by the second light receiving element 20B is less than the threshold means a case where no signal is output from the second light receiving element 20B.

The notification unit 28 issues a notification concerning the determination result of the determination unit 26. Using at least one of a speaker, a light emitting unit, or a display unit, the notification unit 28 provides a notification that the loopback optical fiber 30 is deteriorated. At least one of the speaker, the light emitting unit, or the display unit may be provided in the optical communication device 16 or in the last optical communication unit 12 (see FIG. 1). Further, at least one of the speaker, the light emitting unit, or the display unit may be provided in an optical communication unit 12 other than the last optical communication unit 12. When an optical communication unit 12 other than the last optical communication unit 12 is provided with at least one of the speaker, the light emitting unit, or the display unit, the notification unit 28 controls the communication circuit 22. In this case, the notification unit 28 issues a notification concerning the determination result of the determination unit 26 by transmitting the operation signal to the optical communication unit 12 other than the last optical communication unit 12 via the first communication optical fiber 14A.

The notification unit 28 may control the speaker so as to output a voice indicating that the loopback optical fiber 30 is deteriorated. Further, the notification unit 28 may control the light emitting unit so as to have the color, the brightness, the number of flashes per unit time, or the like indicating that the loopback optical fiber 30 is deteriorated. Further, the notification unit 28 may control the display unit so as to display on the display screen a message indicating that the loopback optical fiber 30 is deteriorated.

As described above, the optical communication device 16 of the present embodiment transmits a test signal to the loopback optical fiber 30 having an optical attenuation amount per unit distance which is larger than that of the first communication optical fiber 14A. When the amount of light received by the second light receiving element 20B corresponding to the test signal is less than the threshold, the optical communication device 16 determines that the loopback optical fiber 30 is deteriorated, and issues a notification concerning the determination result.

Thus, when it is determined that the loopback optical fiber 30 is deteriorated, it is possible to issue a warning to the operator that there is a possibility of deterioration of the first communication optical fiber 14A, and to give the operator an opportunity for inspection or the like. As a result, according to the present embodiment, it is possible to detect an abnormality of the communication optical fiber 14 at an early stage even if the existing communication optical fiber 14 is used as it is.

Modifications

The above embodiment may be modified as follows.

Modification 1

Figure 3:
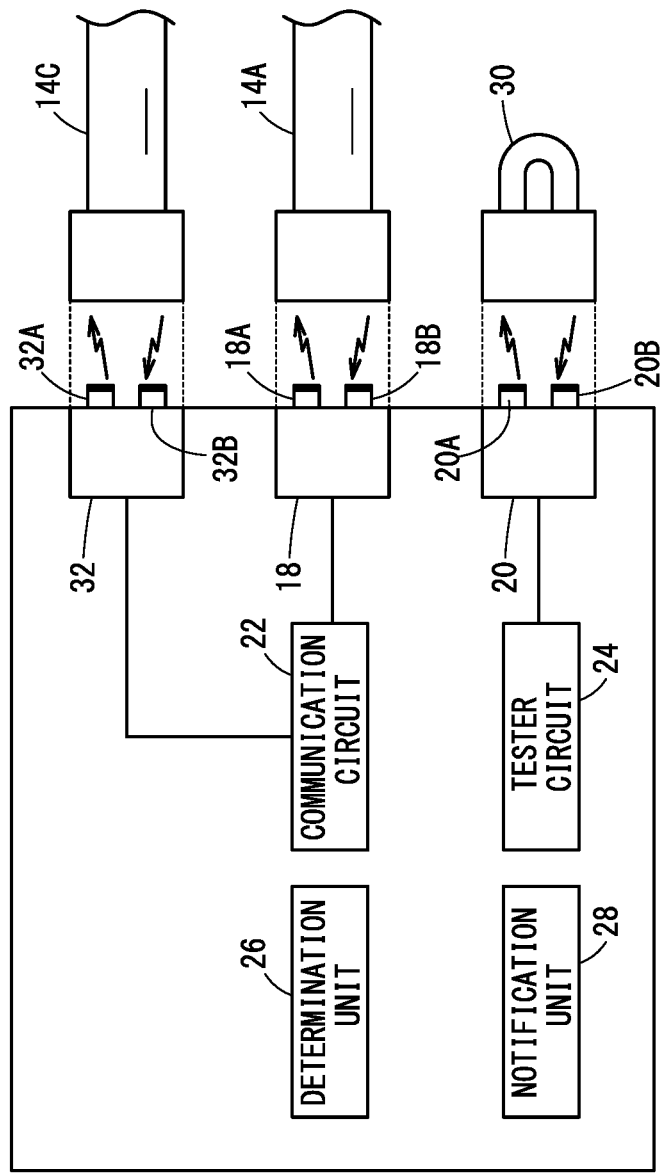
FIG. 3 is a block diagram illustrating an optical communication device provided in an optical communication unit between a foremost optical communication unit and a last optical communication unit.

FIG. 3 is a block diagram showing the optical communication device 16 provided in the optical communication unit 12 between the foremost optical communication unit 12 and the last optical communication unit 12. In this modification, the optical communication unit 12 between the foremost optical communication unit 12 and the last optical communication unit 12 is referred to as an intermediate communication unit 12. In the case of the optical communication system 10 shown in FIG. 1, the intermediate communication unit 12 is a second optical communication unit 12 or a third optical communication unit 12. In FIG. 3, the same reference numerals are assigned to the same constituent elements as those described above. In the present exemplary modification, descriptions that overlap or are duplicative of those stated above will be omitted.

The optical communication device 16 provided in the intermediate communication unit 12 further includes a third port 32. The third port 32 is a port to which a third communication optical fiber 14C for communicating with the optical communication unit 12 can be connected. The third port 32 has a third light emitting element 32A and a third light receiving element 32B. A third communication optical fiber 14C is connected to the third port 32. The optical communication device 16 can communicate with an optical communication unit 12 arranged immediately after the intermediate communication unit 12 via the third communication optical fiber 14C connected to the third port 32. Further, the optical communication device 16 can communicate with an optical communication unit 12 arranged immediately prior to the intermediate communication unit 12 via the first communication optical fiber 14A connected to the first port 18.

That is, the communication circuit 22 can transmit a transmission signal to the third communication optical fiber 14C using the third light emitting element 32A, and can receive a reception signal from the third communication optical fiber 14C using the third light receiving element 32B. On the other hand, the communication circuit 22 can transmit a transmission signal to the first communication optical fiber 14A using the first light emitting element 18A, and can receive a reception signal from the first communication optical fiber 14A using the first light receiving element 18B.

The optical communication device 16 provided in the intermediate communication unit 12 includes the tester circuit 24, the determination unit 26 and the notification unit 28 as in the above-described embodiment. Therefore, even if the intermediate communication unit 12 is provided with the optical communication device 16, an abnormality of the communication optical fiber 14 can be detected at an early stage even if the existing communication optical fiber 14 is used as it is, in a similar manner to the above-described embodiment.

Modification 2

Figure 4:
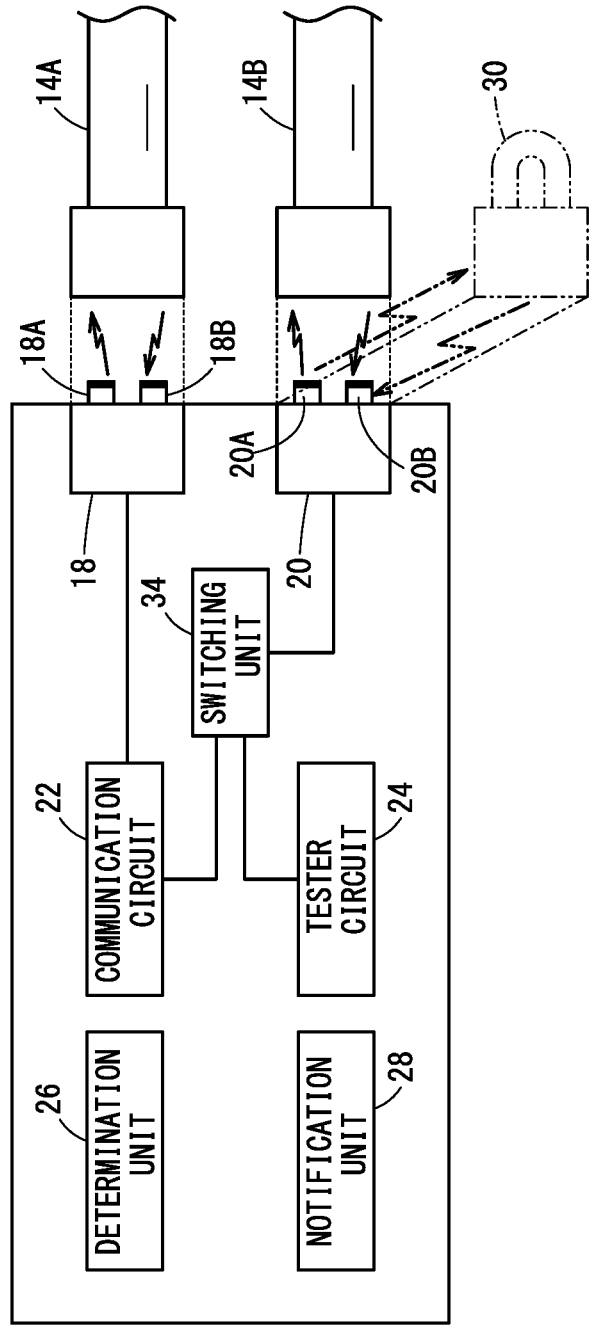
FIG. 4 is a block diagram illustrating a modification of the optical communication device provided in a last optical communication unit.

FIG. 4 is a block diagram illustrating a modification of the optical communication device 16 provided in the last optical communication unit 12. In FIG. 4, the same reference numerals are assigned to the same constituent elements as those described above. In the present exemplary modification, descriptions that overlap or are duplicative of those stated above will be omitted.

The second port 20 can connect the second communication optical fiber 14B in place of the loopback optical fiber 30. In this case, one or more optical communication units 12 may be newly connected in a daisy chain subsequently to the last optical communication unit 12 in the above embodiment. That is, the last optical communication unit 12 in the above-described embodiment can be configured as the above-described intermediate communication unit 12.

Therefore, in the present modification, a switching unit 34 is newly provided. The switching unit 34 switches the connection with the second port 20, to the tester circuit 24 or the communication circuit 22. That is, the switching unit 34 switches between the tester circuit 24 and the communication circuit 22, for transmitting and receiving signals using the second light emitting element 20A and the second light receiving element 20B.

The switching unit 34 detects an optical fiber connected to the second port 20. In the case that the optical fiber connected to the second port 20 is the loopback optical fiber 30, the switching unit 34 connects the tester circuit 24 to the second port 20. On the other hand, in the case that the optical fiber connected to the second port 20 is the second communication optical fiber 14B, the switching unit 34 connects the communication circuit 22 to the second port 20. In the case that the optical fiber connected to the second port 20 cannot be detected, the switching unit 34 may connect the tester circuit 24 or the communication circuit 22 to the second port 20 according to an operation of the operator.

In the case that the communication circuit 22 is connected to the second port 20, the communication circuit 22 transmits a transmission signal to the second communication optical fiber 14B using the second light emitting element 20A. The communication circuit 22 receives a reception signal from the second communication optical fiber 14B using the second light receiving element 20B.

As described above, according to this modification, the same effect as that of the above-described embodiments can be obtained even if the optical communication device 16 is provided in any of the plurality of optical communication units 12 connected in a daisy chain.

Modification 3

The optical communication device 16 of the above-described embodiment may be provided in the foremost optical communication unit 12. Even if the optical communication device 16 of the above-described embodiment is provided in the foremost optical communication unit 12, the same result as that of the embodiment can be obtained. Further, the optical communication device 16 of the second modification may be provided in the foremost optical communication unit 12. In the case that the optical communication device 16 of the second modification is provided in the foremost optical communication unit 12, the first port 18 need not necessarily be provided. In this case, at least one of the optical communication units 12 other than the foremost optical communication unit 12 is provided with the optical communication device 16 according to the above embodiment.

Modification 4

In the above-described embodiment or modification 1, the second port 20 may be a dedicated port for the loopback optical fiber 30. In this case, the second light emitting element 20A may emit light whose emission intensity is lower than the emission intensity of the first light emitting element 18A of the first port 18. Thus, the degree to which the loopback optical fiber 30 is judged to be deteriorated can be adjusted according to the type or the like of the second light emitting element 20A.

Further, in the case that the second port 20 is a dedicated port for the loopback optical fiber 30, the second light receiving element 20B may have a light receiving sensitivity lower than that of the first light receiving element 18B of the first port 18. Thus, the degree to which the loopback optical fiber 30 is judged to be deteriorated can be adjusted according to the type or the like of the second light receiving element 20B.

Modification 5

The determination unit 26 may change the threshold for determining that the loopback optical fiber 30 is deteriorated, according to the operation of the operator. Thus, the degree to which the loopback optical fiber 30 is judged to be deteriorated can be adjusted according to the environment or the like where the optical communication system 10 is installed.

Modification 6

The above-described embodiments and modifications 1 to 5 may be arbitrarily combined within a range in which no technical inconsistencies occur.

A first aspect and a second aspect of the invention will be described below as aspects of the invention that can be understood from the embodiments and modifications.

First Aspect of Invention

The first aspect of the invention is characterized by the optical communication device (16) including the first port (18) including the first light emitting element (18A) and the first light receiving element (18B), and to which the first communication optical fiber (14A) is configured to be connected, the loopback optical fiber (30) configured to have the optical attenuation amount per unit distance larger than optical attenuation amount per unit distance of the first communication optical fiber, the second port (20) including the second light emitting element (20A) and the second light receiving element (20B), and to which the loopback optical fiber is configured to be connected, the communication circuit (22) configured to transmit the transmission signal to the first communication optical fiber using the first light emitting element and receive the reception signal from the first communication optical fiber using the first light receiving element, the tester circuit (24) configured to transmit the test signal to the loopback optical fiber using the second light emitting element and receive the test signal from the loopback optical fiber using the second light receiving element, the determination unit (26) configured to determine that the loopback optical fiber is deteriorated in the case that the amount of light received by the second light receiving element is less than the threshold, and the notification unit (28) configured to issue the notification concerning the determination result of the determination unit.

Thus, when it is determined that the loopback optical fiber is deteriorated, it is possible to issue a warning to the operator that there is a possibility of deterioration of the first communication optical fiber, and to give the operator an opportunity for inspection or the like. As a result, it is possible to detect an abnormality of the communication optical fiber at an early stage even if the existing communication optical fiber is used as it is.

The second communication optical fiber (14B) may be configured to be connected to the second port in place of the loopback optical fiber, and the communication circuit may be configured to transmit the transmission signal to the second communication optical fiber using the second light emitting element and receive the reception signal from the second communication optical fiber using the second light receiving element, and the optical communication device may further include the switching unit (34) configured to switch between the tester circuit and the communication circuit, to connect with the second port. Thus, even if any of the plurality of optical communication units connected in a daisy chain is provided with an optical communication device, it is possible to detect an abnormality of the communication optical fiber at an early stage even if the existing communication optical fiber is used as it is.

The optical communication device may further include the third port (32) including the third light emitting element (32A) and the third light receiving element (32B), and to which the third communication optical fiber (14C) is configured to be connected, wherein the communication circuit may be configured to transmit the transmission signal to the third communication optical fiber using the third light emitting element and receive the reception signal from the third communication optical fiber using the third light receiving element. Thus, even if the optical communication unit among the plurality of optical communication units connected in a daisy chain, between the foremost optical communication unit and the last optical communication unit, is provided with an optical communication device, it is possible to detect an abnormality of the communication optical fiber at an early stage even if the existing communication optical fiber is used as it is.

The second light emitting element may have the emission intensity lower than the emission intensity of the first light emitting element. Thus, the degree to which the loopback optical fiber is judged to be deteriorated can be adjusted according to the type or the like of the second light emitting element.

The second light receiving element may have the light receiving sensitivity lower than the light receiving sensitivity of the first light receiving element. Thus, the degree to which the loopback optical fiber is judged to be deteriorated can be adjusted according to the type or the like of the second light receiving element.

Second Aspect of Invention

The second aspect of the invention is characterized by the optical communication system (10) including the plurality of optical communication units (12) which are connected in the daisy chain via the communication optical fiber (14) and are configured to transmit and receive signals to and from each other. At least one of the plurality of optical communication units is provided with the above-described optical communication device. Since the above-described optical communication device is provided, it is possible to detect an abnormality of the communication optical fiber at an early stage even if the existing communication optical fiber is used as it is.

The foremost optical communication unit among the plurality of optical communication units connected in the daisy chain may be the master unit configured to control communication of each of the plurality of optical communication units, and at least the last optical communication unit among the plurality of optical communication units connected in the daisy chain may be provided with the above-described optical communication device. Thus, even if any of a plurality of optical communication units connected in a daisy chain is provided with an optical communication device, it is possible to detect an abnormality of the optical communication fiber at an early stage by using the existing optical communication fiber as it is.

The invention claimed is:

1. An optical communication device comprising:
  a first port including a first light emitting element and a first light receiving element, and to which a first communication optical fiber is configured to be connected;
  a loopback optical fiber configured to have an optical attenuation amount per unit distance larger than an optical attenuation amount per unit distance of the first communication optical fiber;
  a second port including a second light emitting element and a second light receiving element, and to which the loopback optical fiber is configured to be connected;
  a communication circuit configured to transmit a transmission signal to the first communication optical fiber using the first light emitting element and receive a reception signal from the first communication optical fiber using the first light receiving element;
  a tester circuit configured to transmit a test signal to the loopback optical fiber using the second light emitting element and receive the test signal from the loopback optical fiber using the second light receiving element;
  a determination unit configured to determine that the loopback optical fiber is deteriorated in a case that an amount of light received by the second light receiving element is less than a threshold; and
  a notification unit configured to issue a notification concerning a determination result of the determination unit,
  wherein a second communication optical fiber is configured to be connected to the second port in place of the loopback optical fiber,
  the communication circuit is configured to transmit a transmission signal to the second communication optical fiber using the second light emitting element and receive a reception signal from the second communication optical fiber using the second light receiving element, and
  the optical communication device further comprises a switching unit configured to switch between the tester circuit and the communication circuit, to connect with the second port.

2. The optical communication device according to claim 1, further comprising a third port including a third light emitting element and a third light receiving element, and to which a third communication optical fiber is configured to be connected,
  wherein the communication circuit is configured to transmit a transmission signal to the third communication optical fiber using the third light emitting element and receive a reception signal from the third communication optical fiber using the third light receiving element.

3. An optical communication system comprising a plurality of optical communication units which are connected in a daisy chain via a communication optical fiber and are configured to transmit and receive signals to and from each other,
  wherein at least one of the plurality of optical communication units is provided with the optical communication device according to claim 1.

4. The optical communication system according to claim 3, wherein a foremost optical communication unit among the plurality of optical communication units connected in the daisy chain is a master unit configured to control communication of each of the plurality of optical communication units, and
  at least a last optical communication unit among the plurality of optical communication units connected in the daisy chain is provided with the optical communication device.

* * * * *